United States Patent [19]
Akashi

[11] Patent Number: 4,500,990
[45] Date of Patent: Feb. 19, 1985

[54] DATA COMMUNICATION DEVICE INCLUDING CIRCUITRY RESPONSIVE TO AN OVERFLOW OF AN INPUT PACKET BUFFER FOR CAUSING A COLLISION

[75] Inventor: Fumio Akashi, Tokyo, Japan

[73] Assignee: NEC Corporation, Tokyo, Japan

[21] Appl. No.: 484,675

[22] Filed: Apr. 13, 1983

[30] Foreign Application Priority Data

Apr. 14, 1982 [JP] Japan .................................. 57-61896
Dec. 24, 1982 [JP] Japan ................................ 57-231602

[51] Int. Cl.³ ............................................. H04Q 9/00
[52] U.S. Cl. ....................................... 370/85; 370/94; 340/825.5
[58] Field of Search .................. 370/85, 94; 340/825.5

[56] References Cited

U.S. PATENT DOCUMENTS 4,063,220 12/1977 Metcalfe et al. ................. 340/825.5
4,099,024  7/1978 Boggs et al. ...................... 178/71 R
4,234,952 11/1980 Gable .................................. 370/85
4,292,623  9/1981 Eswaran et al. ...................... 370/85
4,380,761  4/1983 Boggs .................................. 370/85
4,412,326 10/1983 Limb .................................... 370/85

OTHER PUBLICATIONS

"Ethernet: Distributed Packet Switching for Local Computer Networks", by R. M. Metcalfe et al., Communications of the ACM, vol. 19, #7, Jul. 1976.

Primary Examiner—Douglas W. Olms
Assistant Examiner—Kenneth I. Rokoff
Attorney, Agent, or Firm—Sughrue, Mion, Zinn, Macpeak and Seas

[57] ABSTRACT

A data communication device for use either as an interface between a data processing device and a transmission medium of a CSMA/CD network or as a repeater between a CSMA/CD network and an additional data communication network which shares a transmission medium with the CSMA/CD network, sends an obstruction signal towards the CSMA/CD network when an input buffer tends to overflow on storing an input data packet for delivery to the data processing device or for transmission towards the additional data communication network. The obstruction signal is for causing a collision in the CSMA/CD network. The additional data communication network may be plural in number. When the additional data communication networks are CSMA/CD networks, the transmission of data packets thereto is suspended when a collision is detected at the repeater. The transmission is restarted a variable interval after disappearance of the collision. The variable interval corresponds to a weighted random number known in the art.

5 Claims, 5 Drawing Figures

DATA COMMUNICATION DEVICE INCLUDING CIRCUITRY RESPONSIVE TO AN OVERFLOW OF AN INPUT PACKET BUFFER FOR CAUSING A COLLISION

BACKGROUND OF THE INVENTION

This invention relates to a data communication device which is to be connected at least to a transmission medium of a data communication network operable in compliance with the CSMA/CD (carrier sense multiple access with collision detection) scheme as called in the art. More particularly, this invention relates to a data communication device for use either as an interface in a transceiver of a CSMA/CD network or as a repeater circuit between a CSMA/CD network and at least one other data communication network which may or may not comprise a CSMA/CD network.

A data communication network operable in accordance with the CSMA/CD scheme, is revealed in U.S. Pat. No. 4,063,220 issued to Robert M. Metcalfe et al, assignors to Xerox Corporation. The transmission medium of the CSMA/Cd network is for transmitting digital signals as data packets. On starting transmission of a data packet, each transceiver of the network senses a carrier transmitted through the transmission medium. The word "carrier" is used in the art to mean another data packet which is transmitted either to the transceiver under consideration or to another transceiver of the network. If no carrier is sensed, the transceiver sends the data packet onto the transmission medium. If a carrier is sensed, the carrier is later sensed again. The transceiver sends the data packet to the transmission medium after having sensed disappearance of the carrier.

If the carrier were not sensed on starting the transmission, a collision would take place on the transmission medium between the data packets by which the transmission medium is simultaneously accessed by two or more transceivers. When the transmission medium is concurrently accessed by two remote transceivers, a collision may take place even with the carrier sensing due to a propagation delay of the data packets along the transmission medium. Each transceiver therefore includes according to Metcalfe et al, a collision detector to detect a collision and produce a collision signal when a collision is occurred. The collision signal is used in suspending transmission of a data packet onto the transmission medium.

Even with the collision detection, two transceivers may concurrently restart the transmission. Another collision is inevitable. A variable interval corresponding to a weighted random number, is therefore preferably used according to Metcalfe et al on restarting the transmission.

Each transceiver preferably includes a packet buffer as an input buffer for temporarily storing a data packet received by that transceiver as a received packet. When a data processing device connected to that transceiver is operable at a low data processing rate, the packet buffer may overflow. Such an overflow results in a loss in the data packet. This unfavorably affects the transmission efficiency of the CSMA/CD network. The data processing device as herein called, is what is named a "using device" by Metcalfe et al.

A repeater circuit is shown in the Metcalfe et al patent in connecting a first segment of the transmission medium with a second segment thereof. The repeater circuit comprises first and second local transceivers for connection to the first and the second segments, respectively, and a repeater logic between the local transceivers.

An improved repeater circuit is disclosed in U.S. Pat. No. 4,099,024 issued to David R. Boggs et al and assigned to Xerox Corporation. In the improved repeater circuit, each local transceiver includes a collision detector of the type used by Metcalfe et al. A collision signal produced in response to a collision on one of the segments, is transmitted to the other segment by the local transceiver connected thereto.

Although not obvious even from the Boggs et al patent, it may be desirable to make the repeater logic include a packet buffer for temporarily storing the data packets received from one of the segments as received packets when a collision takes place between the data packets received from both segments. The packet buffer, however, would give rise to the problems of the type described in connection with the CSMA/CD network according to Metcalfe et al as will later become clear as the description proceeds with reference to several figures of the accompanying drawing.

SUMMARY OF THE INVENTION

It is therefore a general object of the present invention to provide a data communication device for connection at least to a transmission medium of a CSMA/CD network, which device is capable of giving a favorable transmission efficiency to the CSMA/CD network.

It is another general object of this invention to provide a data communication device of the type described, which hardly gives rise to a loss in data packets transmitted in the CSMA/CD network.

It is a specific object of this invention to provide a data communication device for use as a transceiver of a CSMA/CD network, which device includes a packet buffer for temporarily storing an input packet without an overflow.

It is another specific object of this invention to provide a data communication device for use as a repeater circuit between a CSMA/CD network and at least one additional data communication network which may or may not comprise a CSMA/CD network, which device includes a packet buffer for temporarily storing input packets without an overflow.

According to an aspect of this invention, there is provided a data communication device for use between a data processing device and a transmission medium of a data communication network including a plurality of transceivers by which the transmission medium is accessible by packets of digital signals with collision detection. The packets include address parts by which the data communication device and the transceivers are identifiable. The data communication device comprises: a receiver for receiving the digital signals from the transmission medium to produce received packets; a packet buffer; and selecting means responsive to the address parts included in the received packets for selecting that one of the received packets as a selected packet which includes the address part for the data communication device. The selecting means thereby delivers the selected packet to the packet buffer to load the packet buffer with at least a portion of the selected packet delivered thereto. The data communication device further comprises packet delivering means, sensing means, and obstruction signal transmitting means as follows.

The packet delivering means is coupled to the packet buffer for delivering the selected packet stored in the packet buffer to the data processing device.

The sensing means is coupled to the packet buffer for sensing whether or not the packet buffer is capable of storing an additional portion of the selected packet delivered thereto. The sensing means produces an overflow flag upon sensing that the packet buffer is no more capable of storing the additional portion in addition to the portion already stored therein.

The obstruction signal transmitting means is responsive to the overflow flag for transmitting an obstruction signal to the transmission medium. The obstruction signal is for causing a collision on the transmission medium.

According to another aspect of this invention, there is provided a data communication device for use between a specific and an additional segment of a transmission medium of a data communication network including a plurality of transceivers by which the specific and the additional segments are accessible by packets of digital signals. The packets include address parts by which the transceivers are identifiable. The transceivers by which the specific segment is accessible, are capable of carrying out collision detection.

Inasmuch as the data communication device in question is for use between the specific and the additional segments rather than between a transmission medium of a CSMA/CD network and a data processing device, the above-specified receiver is for receiving the digital signals from the specific segment. The selecting means is for selecting those of the received packets as selected packets which include the address parts for the transceivers by which the additional segment is accessible. The packet delivering means is now called packet transmitting means, which is coupled to the packet buffer for transmitting the selected packets stored in the packet buffer to the additional segment. The obstruction signal transmitting means is for transmitting the obstruction signal to the specific segment.

According to still another aspect of this invention, there is provided a data communication device for use between a specific and an additional segments of a transmission medium of a data communication network including a plurality of transceivers by which the specific and the additional segments are accessible by packets of digital signals with collision detection. The packets include address parts by which the transceivers are identifiable.

Inasmuch as the specific and the additional segments, although differently named, are segments of a transmission medium which are used in two CSMA/CD networks, respectively, the data communication device under consideration comprises two receivers, which may be called specific and additional receivers, for receiving the digital signals from the specific and the additional segments, respectively, and for detecting collisions on the specific and the additional segments, respectively. Attention will be directed to the specific receiver, which produces received packets upon receiving the digital signals. The selecting means is responsive to the address parts included in the received packets for selecting those of the received packets as selected packets which include the address parts for the transceivers by which the additional segment is accessible. The packet transmitting means is coupled not only to the packet buffer but also to the additional receiver for carrying out transmission of the selected packets stored in the packet buffer to the additional segment insofar as none of the digital signals is received by the additional receiver. The transmission is suspended upon detection of a collision on the additional segment and restarted a variable interval after disappearance of the collision. The variable interval corresponds to a weighted random number.

According to further aspects of this invention, there are provided data communication devices which are similar to the devices according to two latter aspects described above and are for use as repeater circuits, each between a CSMA/CD network and a plurality of additional data communication networks which may or may not comprise a CSMA/CD network.

DESCRIPTION OF THE PREFERRED EMBODIMENTS

Figure 1:
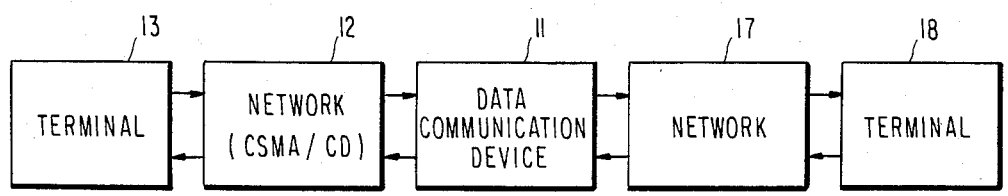
FIG. 1 is a block diagram of an overall data communication network comprising a data communication device to which the instant invention is applicable.

Referring to FIG. 1, an overall data communication network including a data communication device 11 to which the present invention is applicable, will be described at first in order to facilitate an understanding of this invention. The network includes a single transmission medium symbolically indicated by arrows between blocks. As will later become clear as the description proceeds, the transmission medium may comprise one or more branches or bifurcations.

The transmission medium comprises a specific segment accompanying a specific data communication network 12 and a specific data communication terminal 13. The specific network 12 may include a plurality of data communication terminals (not shown) connected to the specific segment. The specific network 12 is for carrying out data communication between the data communication terminals of the network 12 and the illustrated terminal 13 in compliance with the CSMA/CD scheme described heretobefore. In other words, the specific segment is for transmitting digital signals in data packets, respectively, and with collision detection. Such data communication terminals and like data communication terminals to be described in the following, are herein called transceivers.

The transmission medium further comprises an additional segment accompanying an additional data communication network 17 and an additional transceiver 18. Like the CSMA/CD network 12, the additional network 12 may include a plurality of transceivers (not shown) connected to the additional segment. The additional network 17 is for carrying out data communication between the transceivers of the network 17 and the illustrated additional transceiver 18 according to any one of known data communication schemes including the CSMA/CD scheme.

The data communication device 11 is for use as a repeater circuit between the specific and the additional segments. The data communication device 11 may transmit the digital signals unidirectionally from the specific segment to the additional segment to allow the data communication to be carried out from the transceivers, such as the transceiver 13, connected to the specific segment to the transceivers, as 18, connected to the additional segment. Alternatively, the data communication device 11 may transmit the digital signals bidirectionally between the specific and the additional segments. In either event, the data packets include address parts, respectively, by which it is possible to identify the transceivers, such as 13 and 18, connected to the single transmission medium.

Figure 2:
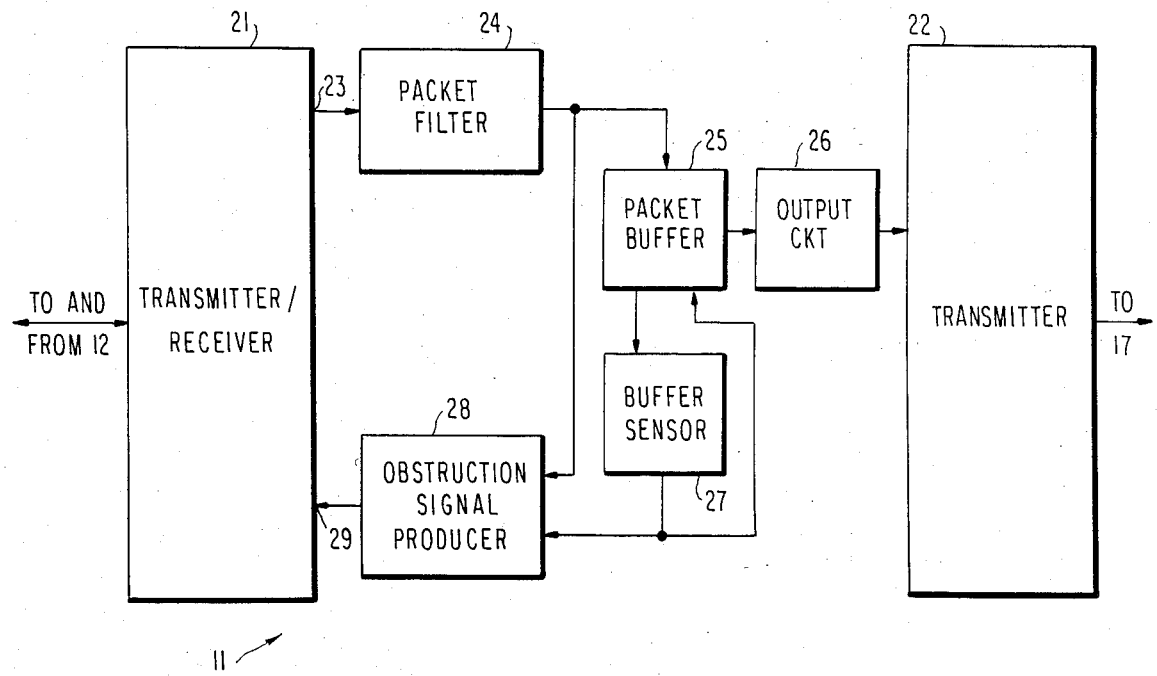
FIG. 2 is a block diagram of a data communication device according to a first embodiment of this invention.

Referring now to FIG. 2, a data communication device 11 according to a first embodiment of this invention is operable as a repeater circuit for unidirectionally transmitting digital signals from a specific segment to an additional segment which may or may not be another specific segment. The data communication device 11 comprises a transmitter-receiver 21 for connection to the specific segment and a transmitter 22 for connection to the additional segment as indicated by legends "to and from 12" and "to 17" by using the reference numerals for the CSMA/CD and the additional networks 12 and 17 (FIG. 1), respectively. The transmitter-receiver 21 comprises a receiver part symbolized by a received packet output terminal 23 for receiving the digital signals from the specific segment to produce a sequence of binary codes as a stream of received packets at the output terminal 23. A packet filter 24 is responsive to the address parts of the respective received packets for selecting those of the received packets as selected packets which include the address parts identifying the transceivers, such as 18, connected to the additional segment. The packet filter 24 rejects or abandons those other of the received packets which need not be repeated by the data communication device 11 towards the additional segment.

A packet buffer 25 is for temporarily storing at least a part of the selected packets. An output circuit 26 is coupled to the packet buffer 25 to dump the selected packets stored in the packet buffer 25 therefrom as dumped packets in compliance with the scheme of data transmission in the additional segment. The transmitter 22 is for shaping the dumped packets into the digital signals in the additional segment and for transmitting the shaped digital signals to the additional segment.

The packet buffer 25 is accompanied by a buffer sensor or control circuit 27, which senses whether or not the packet buffer 25 is still capable of storing an additional part of the selected packets in addition to the part already stored therein. More specifically, the buffer sensor circuit 27 compares the amount of the selected packets stored in the packet buffer 25 with a threshold predetermined relative to the memory capacity of the packet buffer 25. The buffer sensor circuit 27 produces a sensor output signal in which an overflow flag appears while the packet buffer 25 is incapable of further storing the additional part. The sensor output signal is fed back to the packet buffer 25 in enabling the packet buffer 25 to store the additional part only during absence of the overflow flag.

The sensor output signal is delivered furthermore to an obstruction signal producing circuit 28 together with the selected packets produced by the packet filter 24. While the overflow flag is present in the sensor output signal and moreover while the selected packets are produced by the packet filter 24, the obstruction signal producing circuit 28 delivers an obstruction or interference signal to an obstruction signal input terminal 29 of the transmitter-receiver 21. The transmitter-receiver 21 transmits the obstruction signal to the specific segment. The obstruction signal is for causing a collision to take place with the digital signals on the specific segment. The collision is detected as described in the above-referenced Metcalfe et al patent. The obstruction signal may therefore be, for example, a carrier signal in the form of a pulse which has a higher power than the digital signals and lasts an interval of time which corresponds to several bits of the digital signals.

Figure 3:
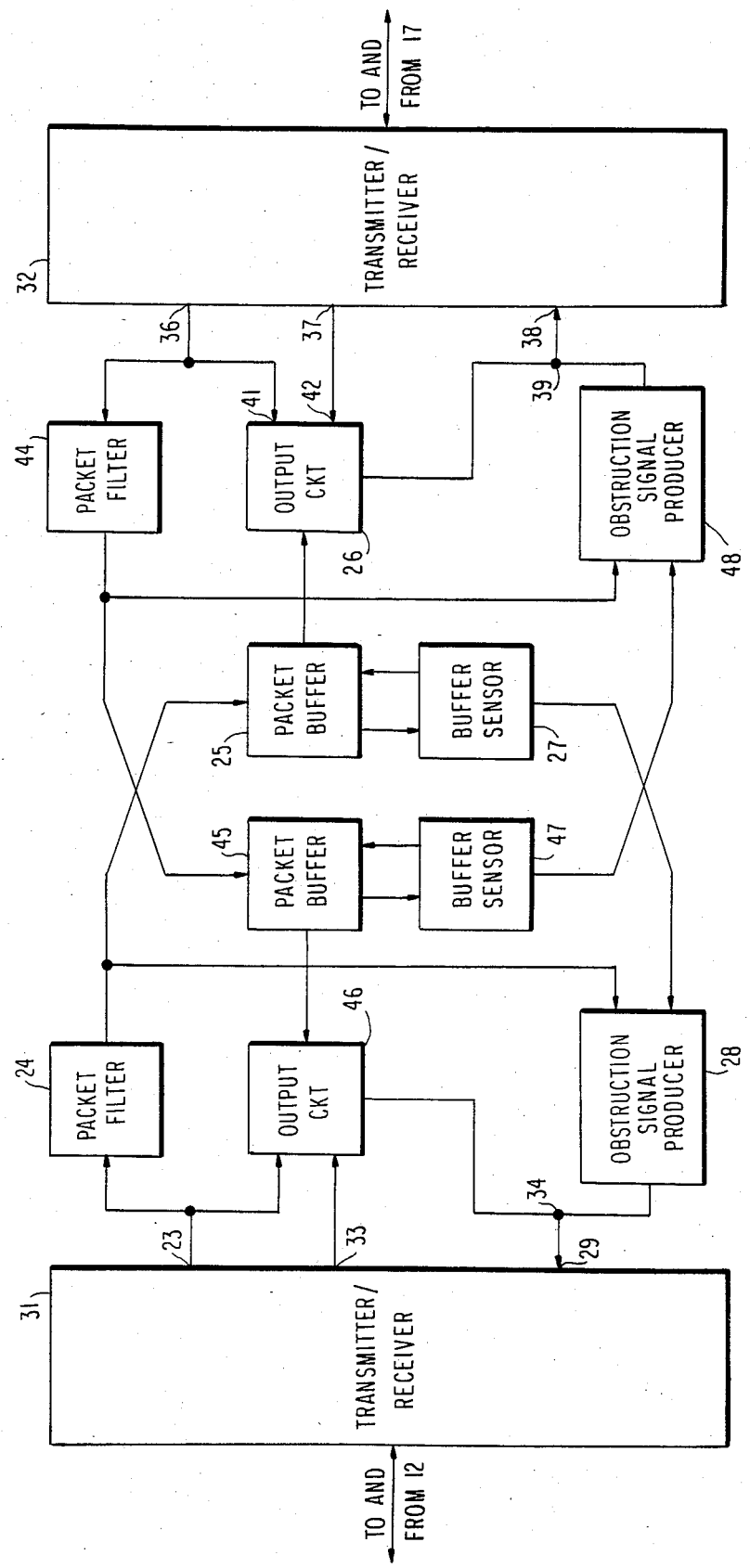
FIG. 3 is a block diagram of a data communication device according to a second embodiment of this invention.

Turning to FIG. 3, a data communication device 11 according to a second embodiment of this invention is a repeater circuit for bidirectionally repeating digital signals between specific and additional segments of a transmission medium. The specific and the additional segments are accompanied by CSMA/CD networks, such as 12 and 17 (FIG. 1), respectively. Similar parts are designated by like reference numerals. Each of the received carrier output terminal 23 and others 24 through 29, will herein be called with addition of a modifier "first" except that the obstruction signal input terminal 29 will be referred to as a first packet and obstruction signal input terminal 29 for the reason which will presently become clear. Likewise, each of the received packets, selected packets, and so forth as well as the overflow flag and the obstruction signal will be called by adding "first" thereto.

Like the data communication device described with reference to FIG. 2, the data communication device 11 being illustrated, comprises first and second transmitter-receivers 31 and 32, which are to be connected to the specific and the additional segments, respectively. As described in the above-cited Boggs et al patent, the first transmitter-receiver 31 detects a collision on the specific segment and produces a first collision signal to a first collision signal output terminal 33. As will shortly become clear, the first packet and obstruction signal input terminal 29 is fed from a first wired OR indicated at 34. The second transmitter-receiver 32 is similar in structure and operation and has a second received packet output terminal 36 for each second received packet, a second collision signal output terminal 37 for a second collision signal, and a second packet and obstruction signal input terminal 38 fed from a second wired OR 39.

The first output circuit 26 is controlled by each second received packet supplied from the second received packet output terminal 36 of the second transmitter-receiver 32 and by the second collision signal. The first output circuit 26 delivers the first dumped packets from the first packet buffer 25 to the second packet and obstruction signal input terminal 38 of the second transmitter-receiver 32 through the second wired OR 39. More particularly, the first output circuit 26 comprises first means represented by a first input terminal 41 fed from the second received packet output terminal 36 for suspending read out of the first selected packet from the first packet buffer 25 during presence of each second received packet and for restarting the read out after lapse of a first delay corresponding to a weighted random number as described in the Metcalfe et al patent. The first output circuit 26 furthermore comprises second means indicated at a second input terminal 42 fed from the second collision signal output terminal 37 for suspending delivery of each first dumped packet therefrom to the second wired OR 39 upon receipt of a second collision signal and for restarting the delivery after lapse of a second delay which is similar to the first delay and may or may not be equal thereto.

The illustrated data communication device 11 further comprises a second packet filter 44, a second packet buffer 45, a second output circuit 46, a second buffer sense circuit 47, and a second obstruction signal producing circuit 48 similar in structure and operation to the first packet filter 24 and so on, respectively. For instance, the second packet filter 44 delivers a stream of second selected packets to the second packet buffer 45 for temporary storage therein. Controlled by each first received packet and also by each first collision signal supplied from the first received packet output terminal 23 of the first transmitter-receiver 31 and from the first collision signal output terminal 33, respectively, the second output circuit 46 delivers a sequence of second dumped packets to the first wired OR 34. The second buffer sense circuit 47 controls the second packet buffer 45 and produces a second sensor output signal, in which a second overflow flag appears upon detection of an overflow of the second packet buffer 45 during production of the second selected packets from the second packet filter 44. A second obstruction signal produced by the second obstruction signal producing circuit 48 is delivered to the second wired OR 39, which feeds either the first dumped packets from the first output circuit 26 or the second obstruction signal to the second packet and obstruction signal input terminal 38 of the second transmitter-receiver 32. The second transmitter-receiver 32 sends either the first dumped packets or the second obstruction signal to the additional segment with each first dumped packet matched to the digital signals on the additional segment.

It will now be understood that the second dumped packets and the first obstruction signal are supplied to the first wired OR 34 from the second output circuit 46 and the first obstruction signal producing circuit 28, respectively, and thence to the first packet and obstruction signal input terminal 29 of the first transmitter-receiver 31. The first transmitter-receiver 31 sends either each second dumped packet or each first obstruction signal to the specific segment.

Figure 4:
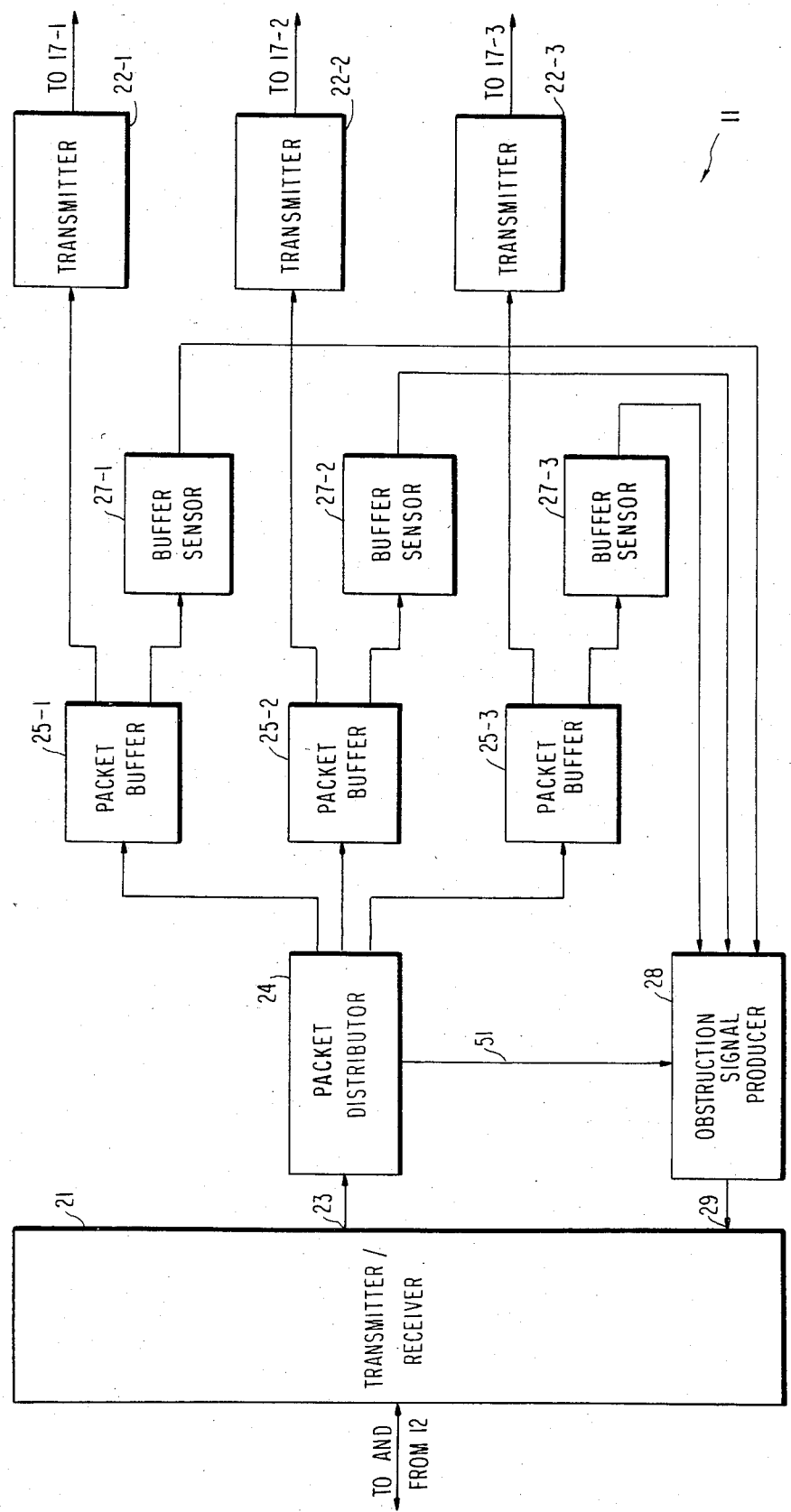
FIG. 4 is a block diagram of a data communication device according to a third embodiment of this invention.

Referring to FIG. 4, a data communication device 11 according to a third embodiment of this invention is a repeater circuit for use between a specific segment of a transmission medium and a plurality of branches of an additional segment of the transmission medium. The specific segment is accompanied by a CSMA/CD network 12 (FIG. 1). Each branch is accompanied by a data communication network, such as 17, which may or may not be a CSMA/CD network. In the example being illustrated, the data communication device 11 undirectionally repeats the digital signals from the specific segment to the respective branches according to the address parts of the digital signal packets. Depending on the circumstances, it is possible to refer to the branches merely as additional segments.

As is the case with the data communication device described with reference to FIG. 2, the data communication device 11 comprises a transmitter-receiver 21 and first through third transmitters 22-1, 22-2, and 22-3 for connection to the respective branches as indicated by the legends "to 17-1," "to 17-2," and "to 17-3." The transmitter-receiver 21 has a received packet output terminal 23. A packet distributor 24 corresponds to the packet filter 24 described in conjunction with FIG. 2 and distributes selected packets to first through third packet buffers 25-1, 25-2, and 25-3 according to the address parts of the received packets. In other words, the packet distributor 24 corresponds to a combination of three packet filters of the type of the packet filter 24 described in connection with FIG. 2 or 3. The packet distributor 24 therefore rejects those others of the received packets which need not be repeated to the respective branches.

It should be understood that the output circuit coupled to each packet buffer 25 (suffix omitted) is included in a pertinent one of the transmitters 22's (suffixes omitted). First through third buffer sense circuits 27-1, 27-2, and 27-3 are for controlling the respective packet buffers 25's and for producing first through third sensor output signals, in which an overflow flag appears when the packet buffer 25 thereby controlled tends to overflow. An obstruction signal producing circuit 28 is common to the buffer sense circuits 27's (suffixes omitted) and delivers an obstruction signal to the obstruction signal input terminal 29 of the transmitter-receiver 21 when an overflow flag is produced by one of the buffer sense circuits 27's while the obstruction signal producing circuit 28 is supplied through a connection 51 with an additional part of the selected packet which is to be stored in the packet buffer 25 under consideration. Operation of the data communication device being illustrated, will now be self-explanatory.

Figure 5:
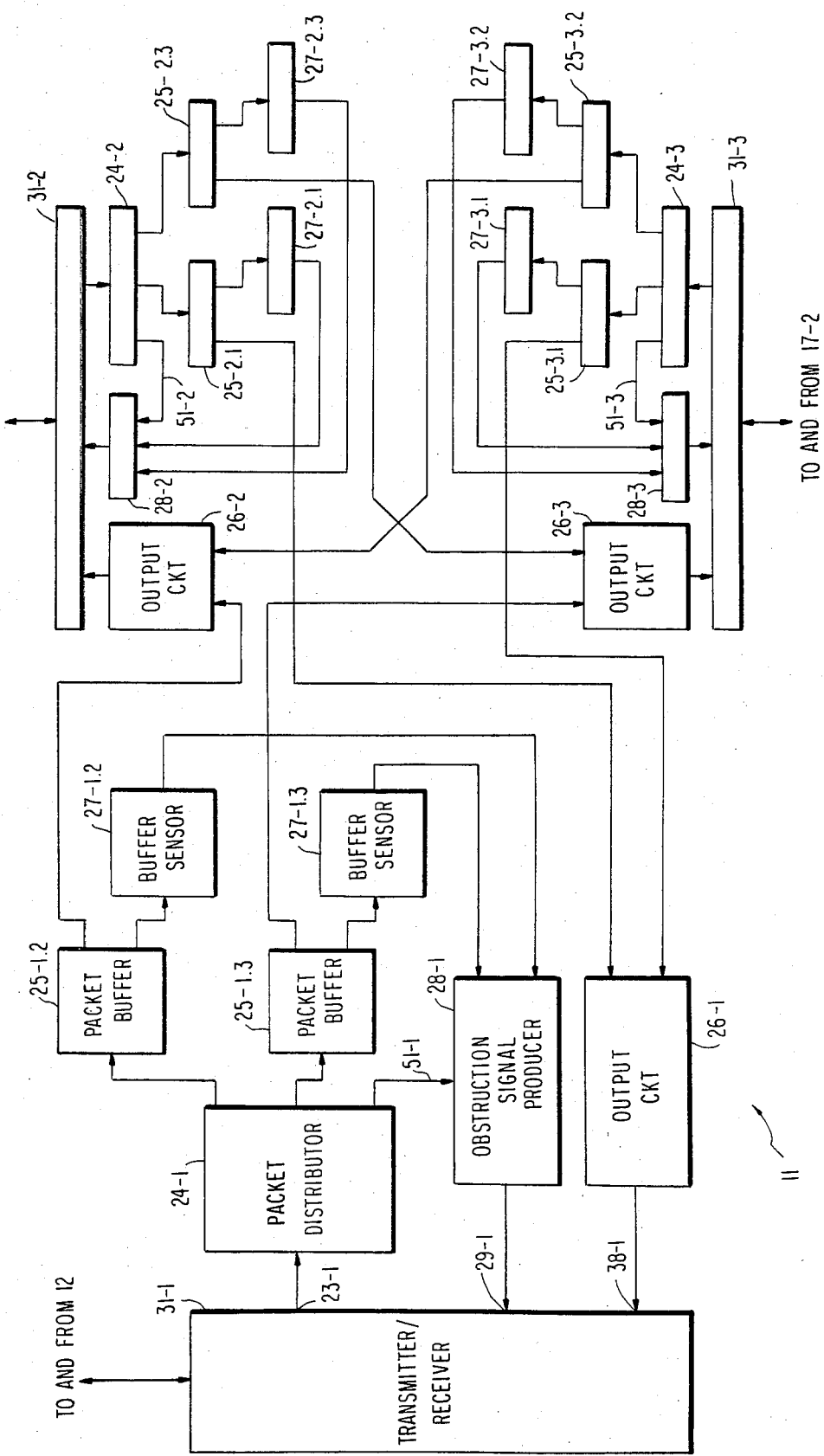
FIG. 5 is a block diagram of a data communication device according to a fourth embodiment of this invention.

Referring to FIG. 5, a data communication device 11 according to a fourth embodiment of this invention is operable as a repeater circuit for bidirectionally repeating digital signals from one of a specific segment of a transmission medium and a plurality of branches of an additional segment of the transmission medium to others of the specific segment and the branches according to the address parts of the respective digital signal packets. Like the specific segment, each branch accompanies a CSMA/CD network, which may be designated by 17-1 and 17-2 (not shown) when the number of branches is two.

The data communication device 11 comprises first through third transmitter-receivers 31-1, 31-2, and 31-3 for connection to the specific segment and the respective branches as indicated by "to and from 12," "to and from 17-1," and "to and from 17-2." Similar parts are designated by like reference numerals with suffixes 1, 2, and 3 added for the parts related to the first through the third transmitter-receivers 31's (suffixes omitted), respectively. For example, the first transmitter-receiver 31-1 has a packet and collision signal output terminal 23-1 and an obstruction signal input terminal 29-1 which correspond to a combination of the received packet output terminal 23 of the first transmitter-receiver 31 described in conjunction with FIG. 3 and the collision signal output terminal 33 thereof and to the obstruction signal input terminal 29 thereof, respectively.

The first output circuit 26-1 is, however, not a counterpart of the "first" output circuit 26 described in connection with FIG. 3 but corresponds to a combination of the "second" output circuit 46 of FIG. 3 and another output circuit for the dumped packets derived from the digital signal packets coming through another additional segment. In other words, the "first" output circuit 26 of FIG. 3 corresponds to a combination of the second and the third output circuits 26-2 and 26-3 of FIG. 5. The first transmitter-receiver 31-1 therefore has a packet input terminal, which is designated by 38-1 rather than by 29-1 in common to the obstruction signal input terminal 29-1.

In operation, the first transmitter-receiver 31-1 receives the digital signals to deliver a stream of received packets to the packet distributor 24-1 through the packet and collision signal output terminal 23-1 and detects a collision on the segment connected thereto to deliver a collision signal to the obstruction signal producing circuit 28-1 through a connection which is not depicted merely for simplicity of illustration. The packet distributor 24-1 distributes the selected packets to two packet buffers 25-1.2 and 25-1.3 for the second and the third transmitter-receivers 31-2 and 31-3, respectively, according to the address parts of the received packets and rejects others of the received packets. The packet buffers 25-1.2 and 25-1.3 are controlled by two buffer sense circuits 27-1.2 and 27-1.3, respectively. The overflow flags, if any, produced by the respective buffer sense circuits 27-1.2 and 27-1.3 are delivered to the obstruction signal producing circuit 28-1. The connection 51-1 is drawn from the packet distributor 24-1 to the obstruction signal producing circuit 28-1 merely because the selected packets are directed to a plurality of packet buffers, such as 25-1.2 and 25-1.3. In addition to the obstruction signal of the type described hereinabove, the obstruction signal producing circuit 28-1 produces an obstruction signal also when a collision signal is supplied thereto.

The dumped packets to be supplied to the packet input terminal 29-1 of the first transmitter-receiver 31-1 are supplied to the output circuit 26-1 from the packet buffers 25-2.1 and 25-3.1 coupled to the second and the third transmitter-receivers 31-2 and 31-3, respectively. The output circuit 26-1 delivers the dumped packets to the packet input terminal 38-1 with a certain priority, which may be predetermined as, for example, the packets dumped from the packet buffer 25-2.1 first and then the packets dumped from the other packet buffer 25-3.1. It will now be seen that the data communication device 11 being illustrated, is operable as the repeater circuit specified above.

While several repeater circuits according to the preferred embodiments of this invention have thus far been described with reference to the accompanying drawing, it will now be readily possible for one skilled in the art to carry this invention into effect in various other manners. For example, the data communication device 11 illustrated with reference to FIG. 2 as a unidirectional repeater circuit, can be modified into an interface for use between a transmission medium of a CSMA/CD network, such as 12, and a data processing device by merely substituting the data processing device for the transmitter 22. Each of the data communication devices illustrated with reference to FIGS. 2 and 4, can be modified into a repeater circuit for bidirectionally repeating the digital signals between the specific segment of a transmission medium and at least one additional segment of the transmission medium.

What is claimed is:

1. A data communication device for use between a data processing device and a transmission medium of a data communication network including a plurality of transceivers by which said transmission medium is accessible by packets of digital signals, said network including collision detection, said packets including address parts by which said data communication device and said transceivers are identifiable, said data communication device comprising:

a receiver for receiving the digital signals from said transmission medium to produce received packets;

a packet buffer;

selecting means responsive to the address parts included in said received packets for selecting that one of said received packets as a selected packet which includes the address part for said data communication device, said selecting means thereby delivering said selected packet to said packet buffer to load said packet buffer with at least a portion of the selected packet delivered thereto;

packet delivering means coupled to said packet buffer for delivering the selected packet stored in said packet buffer to said data processing device;

sensing means coupled to said packet buffer for sensing whether or not said packet buffer is capable of storing an additional portion of the selected packet delivered thereto, said sensing means producing an overflow flag upon sensing that said packet buffer is not capable of storing said additional portion in addition to the portion already stored therein; and obstruction signal transmitting means responsive to said overflow flag for transmitting an obstruction signal to said transmission medium, said obstruction signal causing a collision on said transmission medium.

2. A data communication device for use between a specific and an additional segment of a transmission medium of a data communication network including a plurality of transceivers by which said specific and said additional segments are accessible by packets of digital signals, said packets including address parts by which said transceivers are identifiable, the transceivers by which said specific segment is accessible being capable of carrying out collision detection, said data communication device comprising:

a receiver for receiving the digital signals from said specific segment to produce received packets;

a packet buffer;

selecting means responsive to the address parts included in said received packets for selecting those of said received packets as selected packets which include the address parts for the transceivers by which said additional segment is accessible, said selecting means thereby delivering said selected packets to said packet buffer to load said packet buffer with at least a portion of the selected packets delivered thereto;

packet transmitting means coupled to said packet buffer for transmitting the selected packets stored in said packet buffer to said additional segment;

sensing means coupled to said packet buffer for sensing whether or not said packet buffer is capable of storing an additional portion of the selected packets delivered thereto, said sensing means producing an overflow flag upon sensing that said packet buffer is not capable of storing said additional portion in addition to the portion already stored therein; and obstruction signal transmitting means responsive to said overflow flag for transmitting an obstruction signal to said specific segment, said obstruction signal causing a collision on said specific segment.

3. A data communication device for use between a specific and an additional segment of a transmission medium of a data communication network including a plurality of transceivers by which said specific and said additional segments are accessible by packets of digital signals, said network including collision detection, said packets including address parts by which said transceivers are identifiable, said data communication device comprising:

specific and additional receivers for receiving the digital signals from said specific and said additional segments, respectively, and for detecting collision on said specific and said additional segments, respectively, said specific receiver producing received packets upon receiving the digital signals;

a packet buffer;

selecting means responsive to the address parts included in said received packets for selecting those of said received packets as selected packets which include the address parts for the transceivers by which said additional segment is accessible, said selecting means thereby delivering said selected packets to said packet buffer to load said packet buffer with at least a portion of the selected packets delivered thereto;

packet transmitting means coupled to said packet buffer and said additional receiver for carrying out transmission of the selected packets stored in said packet buffer to said additional segment insofar as the digital signals transmitted from said additional segment are not received by said additional receiver, said transmission being suspended upon detection of a collision on said additional segment and restarted a variable interval after disappearance of said collision, said variable interval corresponding to a weighted random number;

sensing means coupled to said packet buffer for sensing whether or not said packet buffer is capable of storing an additional portion of the selected packets delivered thereto, said sensing means producing an overflow flag upon sensing that said packet buffer is not capable of storing said additional portion in addition to the portion already stored therein; and obstruction signal transmitting means responsive to said overflow flag for transmitting an obstruction signal to said specific segment, said obstruction signal causing a collision on said specific segment.

4. A data communication device for use between a specific segment of a transmission medium of a data communication network and a plurality of additional segments of said transmission medium, said data communication network including a plurality of transceivers by which said specific and said additional segments are accessible by packets of digital signals, said packets including address parts by which said transceivers are identifiable, the transceivers by which said specific segment is accessible being capable of carrying out collision detection, said data communication device comprising:

a receiver for receiving the digital signals from said specific segment to produce received packets;

a plurality of packet buffers for said additional segments, respectively;

selecting means responsive to the address parts included in said received packets for selecting those of said received packets as selected packets which include the address parts for the transceivers by which said additional segments are accesible, said selecting means thereby distributing said selected packets to said packet buffers to load each packet buffer with at least a portion of the selected packet distributed thereto;

packet transmitting means coupled to said packet buffers for transmitting the selected packets stored in said packet buffers to said additional segments;

sensing means coupled to said packet buffers for sensing whether or not each packet buffer is capable of storing an additional portion of the selected packet distributed thereto, said sensing means producing an overflow flag upon sensing that said each packet buffer is not capable of storing said additional portion in addition to the portion already stored therein; and obstruction signal transmitting means responsive to said overflow flag for transmitting an obstruction signal to said specific segment, said obstruction signal causing a collision on said specific segment.

5. A data communication device for use between a specific segment of a transmission medium of a data communication network and a plurality of additional segments of said transmission medium, said data communication network including a plurality of transceivers by which said specific and said additional segments are accessible by packets of digital signals, said network including collision detection, said packets including address parts by which said transceivers are identifiable, said data communication device comprising:

a plurality of receivers for receiving the digital signals from said specific and said additional segments, respectively, and for detecting collisions on said specific and said additional segments, respectively, each receiver producing received packets upon receiving the digital signals;

a plurality of packet buffers for other segments, respectively, said other segments being the segments other than a particular segment from which said each receiver receives the digital signals;

selecting means responsive to the address parts included in said received packets for selecting those of said received packets as selected packets which include the address parts for the transceivers by which said other segments are accessible, said selecting means thereby distributing said selected packets to said packet buffers to load each packet buffer with at least a portion of the selected packet distributed thereto;

packet transmitting means coupled to said packet buffers and to other receivers for carrying out transmission of the selected packets stored in said packet buffers to said other segments insofar as said other receivers do not receive the digital signals from said other segments, said other receivers being the receivers other than said each receiver, the transmission to each of said other segments being suspended upon detection of a collision on said each of the other segments and restarted a variable interval after disappearance of said collision, said variable interval corresponding to a weighted random number;

sensing means coupled to said packet buffers for sensing whether or not each packet buffer is capable of storing an additional portion of the selected packet distributed thereto, said sensing means producing an overflow flag upon sensing that said each packet buffer is not capable of storing said additional portion in addition to the portion already stored therein; and obstruction signal transmitting means responsive to said overflow flag for transmitting an obstruction signal to said particular segment, said obstruction signal causing a collision on said particular segment.

* * * * *

UNITED STATES PATENT AND TRADEMARK OFFICE
CERTIFICATE OF CORRECTION

PATENT NO. : 4,500,990
DATED : February 19, 1985
INVENTOR(S) : Fumio Akashi

It is certified that error appears in the above-identified patent and that said Letters Patent is hereby corrected as shown below:

Column 1, line 23, "/cd" should read --/CD--.

Column 7, line 60, "undirectionally" should read --unidirectionally--.

Column 12, line 48, "bufer" should read --buffer--.

Signed and Sealed this

Seventeenth Day of September 1985

[SEAL]

Attest:

DONALD J. QUIGG

*Attesting Officer*

*Commissioner of Patents and Trademarks—Designate*